(12) United States Patent
Burenkov et al.

(10) Patent No.: US 11,940,714 B2
(45) Date of Patent: Mar. 26, 2024

(54) ULTRA-LOW-NOISE, ON-CHIP QUANTUM DEVICES

(71) Applicants: University of Maryland, College Park, College Park, MD (US); Government of the United States of America, as Represented by the Secretary of Commerce, Washington, DC (US)

(72) Inventors: Ivan A. Burenkov, Gaithersburg, MD (US); Sergey V. Polyakov, Gaithersburg, MD (US)

(73) Assignees: University of Maryland, College Park, College Park, MD (US); Government of the United States of America, as Represented by the Secretary of Commerce, Washington, DC (US)

( * ) Notice: Subject to any disclaimer, the term of this patent is extended or adjusted under 35 U.S.C. 154(b) by 124 days.

(21) Appl. No.: 17/545,451

(22) Filed: Dec. 8, 2021

(65) Prior Publication Data
US 2022/0179283 A1   Jun. 9, 2022

Related U.S. Application Data

(60) Provisional application No. 63/122,562, filed on Dec. 8, 2020.

(51) Int. Cl.
  *G02F 1/35*   (2006.01)
  *G02F 1/313*   (2006.01)
  *G02F 1/365*   (2006.01)

(52) U.S. Cl.
  CPC ............ *G02F 1/3534* (2013.01); *G02F 1/313* (2013.01); *G02F 1/365* (2013.01)

(58) Field of Classification Search
  CPC .......... G02F 1/313; G02F 1/3534; G02F 1/365
  See application file for complete search history.

(56) References Cited

U.S. PATENT DOCUMENTS

| | | | | |
|---|---|---|---|---|
| 5,642,453 | A  * | 6/1997 | Margulis | G02B 6/2821 |
| | | | | 385/24 |
| 11,513,419 | B2 * | 11/2022 | Kippenberg | G02F 1/3513 |
| 2004/0126072 | A1 * | 7/2004 | Hoon Lee | G02B 6/1225 |
| | | | | 385/27 |

(Continued)

FOREIGN PATENT DOCUMENTS

CN   205666427 U  * 10/2016  ............. H01S 3/067

OTHER PUBLICATIONS

Han-Sen Zhong, et al. "Quantum computational advantage using photons", pp. 1-23, Science (2020).

(Continued)

*Primary Examiner* — Daniel Petkovsek
(74) *Attorney, Agent, or Firm* — George Likourezos; Carter, DeLuca & Farrell LLP

(57) ABSTRACT

A quantum EIT-based optical switch includes a first waveguide, linear or nonlinear, a separate nonlinear waveguide evanescently coupled to the first waveguide, and a pump coupled to the nonlinear waveguide. A quantum STIRAP-based optical transduction device, which includes an auxiliary, intermediate spectral state for the quantum signal that aids efficient transduction of the quantum signal from the input spectral state to the output spectral state in a single device.

11 Claims, 11 Drawing Sheets

(56) References Cited

U.S. PATENT DOCUMENTS

| | | | |
|---|---|---|---|
| 2012/0039560 A1* | 2/2012 | Mazur | G02F 3/024 385/2 |
| 2018/0307118 A1* | 10/2018 | Sciancalepore | G02F 1/3536 |
| 2019/0011803 A1* | 1/2019 | Moffitt | G02B 6/12004 |
| 2021/0080804 A1* | 3/2021 | Liscidini | G02F 1/39 |

OTHER PUBLICATIONS

Kevin Luke, et al. "Wafer-scale low-loss lithium niobate photonic integrated circuits", Optics Express 28, vol. 28, No. 17, pp. 1-7, Aug. 17, 2020.

C. Wang, et al., "Integrated lithium niobate electro-optic modulators operating at cmos-compatible voltages", Nature, vol. 562, pp. 1-12, Oct. 4, 2018.

G. I. Stegeman, et al. "X(2) cascading phenomena and their applications to all-optical signal processing, mode-locking, pulse compression and solitons", Optical Quantum Electronics. 28, pp. 1-50 (1996).

D. Bouwmeester, et al., "Experimental quantum teleportation", Nature vol. 390, pp. 1-5, Dec. 11, 1997.

Prem Kumar, "Quantum frequency conversion", Optics Letters, vol. 15, No. 24, pp. 1-3, Dec. 15, 1990.

J. A. Giordmaine, et al., "Tunable Coherent Parametric Oscillation in Linbo3 at Optical Frequencies", Physcial Review, vol. 14, No. 24, pp. 1-4, Jun. 14, 1965.

S. A. Akhmanov, et al., "Observation of Parametric Amplification in the Optical Range", Sov. J. Exp. Theory Phys. Lett. 2, pp. 191-193, (1965).

G. Harder, et al., "Single-Mode Parametric-Down-Conversion States with 50 Photons as a Source for Mesoscopic Quantum Optics", Phys. Rev. Letter, pp. 1-8, May 4, 2016.

J. Zhao, et al., "High quality entangled photon pair generation in periodically poled thin-filmed lithium niobate waveguides", Physical Review Letters, 124, 163603 (2020).

Y.H. Cheng, et al. "Statistically background-free, phase-preserving parametric up-conversion with faint light", Opt. Express 23, 18671, pp. 1-8, May 19, 2015.

I. A. Burenkov, "Quantum frequency bridge: high-accuracy characterization of a nearly-noiseless parametric frequency converter", Optics Express, vol. 25, No. 2, pp. 1-11, Jan. 23, 2017.

P.S. Kuo, et al., "Using temperature to reduce noise in quantum frequency conversion", Optics Letters, vol. 43, No. 9, pp. 1-4, May 1, 2018.

P. C. Strassmann, et al., "Spectral noise in frequency conversion from the visible to the telecommunication c-band", Optics Express, vol. 27, No. 10, pp. 1-10, May 13, 2019.

J. Heng, et al., "Enhanced spectral broadening in an optical parametric oscillator based on a ppln crystal", Optics Express, vol. 28, No. 11, pp. 1-9, May 25, 2020.

M. Zhang, et al. "Monolithic ultra-high-q lithium niobate microring resonator", Optica, vol. 4, No. 12, pp. 1-2, Dec. 2017.

C. Wang, et al. "Ultrahigh-efficiency wavelength conversion in nanophotonic periodically poled lithium niobate waveguides", Optica, vol. 5, No. 11, pp. 1-4, Nov. 2018.

D. N. Christodoulides, et al., "Discretizing light behaviour in linear and nonlinear waveguide lattices", Nature, vol. 424, pp. 1-7, Aug. 14, 2003.

H. B. Perets, et al., "Realization of quantum walks with negligible decoherence in waveguide lattices", Phys. Rev. Lett. 100, pp. 1-4, Apr. 10, 2008.

A. Rai, et al., "Transport and quantum walk of nonclassical light in coupled waveguides", Physical Review, A 78, 042304, pp. 1-5, (2008).

A. L. Jones, et al., "Coupling of Optical Fibers and Scattering in Fibers", Journal of the Optical Society of America, vol. 55, No. 3, pp. 1-11, Mar. 1965.

S. Longhi, "Classical simulation of relativistic quantum mechanics in periodic optical structures", Appl. Phys. B, pp. 1-16, (2011).

R. Keil, et al., "Classical analogue of displaced fock states and quantum correlations in glauber-fock photonic lattices" Physical Review Letters, pp. 1-5, Sep. 2, 2011.

M. Grafe, et al., "On-chip generation of high-order single-photon W-states", Nature Photonics 8, pp. 1-6, Aug. 31, 2014.

A. A. Sukhorukov, et al., "Classical simulation of squeezed light in optical waveguide arrays", Physical Review A 87, 053823, pp. 1-6, (2013).

A. S. Solntsev, et al., "Path-entangled photon sources on nonlinear chips", Reviews in Physica, 2, pp. 1-13, (2017).

E. Travkin, et al., "Compact flat band states in optically induced flatland photonic lattices", Applied Physical Letters, 111, 011104, pp. 1-6, Mar. 14, 2017.

R. Keil, et al., "Optical simulation of charge conservation violation and majorana dynamics", Optica vol. 2, No. 5., pp. 1-6, May 2015.

S. Longhi, "Jaynes-Cummings photonic superlattices", Optics Letters, vol. 36, No. 17, pp. 1-3, Sep. 1, 2011.

A. P. VanDevender, et al., "Quantum transduction via frequency upconversion (invited)", J. Opt. Soc. Am. B 24, pp. 1-5, Feb. 2, 2007.

J. S. Pelc, et al., "Long-wavelength-pumped upconversion single-photon detector at 1550 nm: performance and noise analysis", Optical Express 19, pp. 1-13, Oct. 2011.

P. Fisher, et al., "Integrated optical device for frequency conversion across the full telecom c-band spectrum", Physical Review Applied 13, 024017, pp. 1-7, (2020).

K. R. Parameswaran, et al., "Observation of 99% pump depletion in single-pass second-harmonic generation in a periodically poled lithium niobate waveguide", Optics Letters, vol. 27, No. 1, pp. 1-3, Jan. 1, 2022.

M. H. Chou, et al., "Multiple-channel wavelength conversion by use of engineered quasi-phase-matching structures in linbo3 waveguides", Optics Letters, vol. 24, No. 16, pp. 1-3, Aug. 15, 1999.

M. Asobe, et al., "Multiple quasi-phase-matched linbo3 wavelength converter with a continuously phase-modulated domain structure", Optics Letters, vol. 28, No. 7, pp. 1-3, Apr. 1, 2003.

M. C. Rechtsman, et al., "Photonic Floquet topological insulators", Nature Letter, 496, pp. 1-5, (2013).

M. Jankowski, et al., "Ultrabroadband nonlinear optics in nanophotonic periodically poled lithium niobate waveguides", Optica vol. 7, No. 1, pp. 1-7, Jan. 2020.

T. A. Huffman, et al., "Integrated resonators in an ultralow loss si3n4/sio2 platform for multifunction applications", IEEE Jornal of Selected Topics in Quantum Electronics, vol. 24, No. 4, pp. 1-9, Jul. 4, 2018.

J. Huang, et al., "Amplitude modulation and apodization of quasi-phase-matched interactions", Optics Letters, vol. 31, No. 5, pp. 1-3, Mar. 1, 2006.

B. W. Shore, "Picturing stimulated raman adiabatic passage: a stirap tutorial", Advances in Optics and Photonics, vol. 9, No. 3, pp. 1-157, Sep. 2017.

M. Delanty, et al., "Superradiance of harmonic oscillators", ResearchGate, pp. 1-20, Jul. 25, 2011.

* cited by examiner

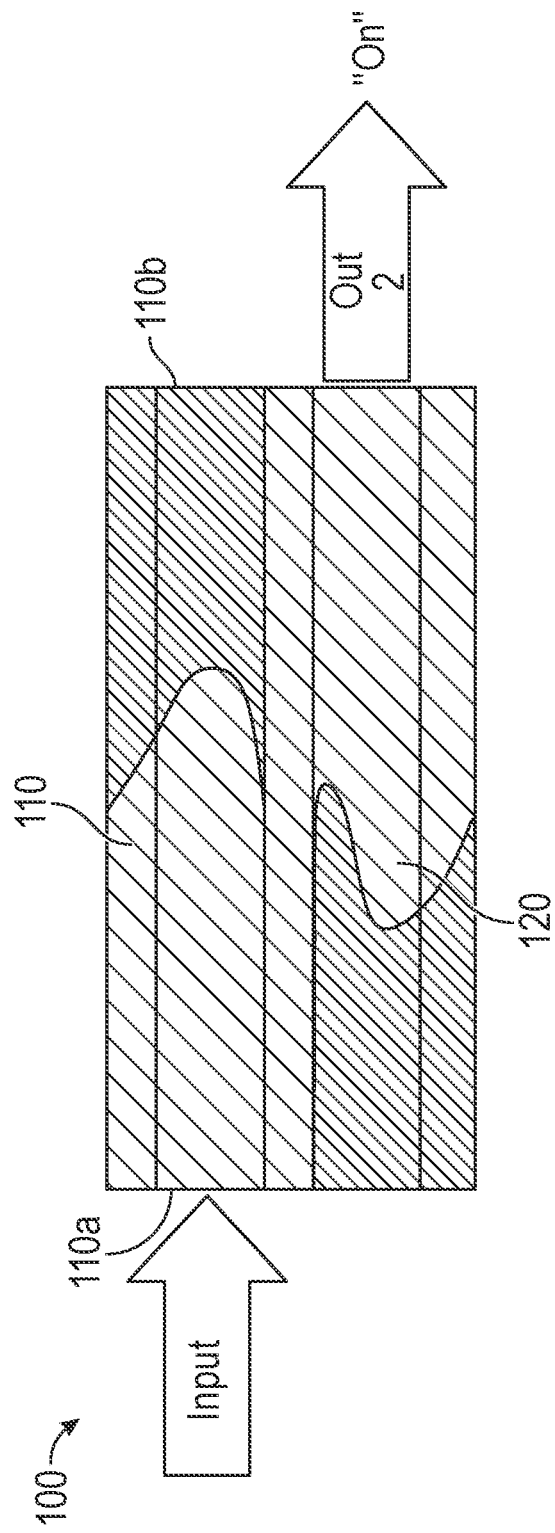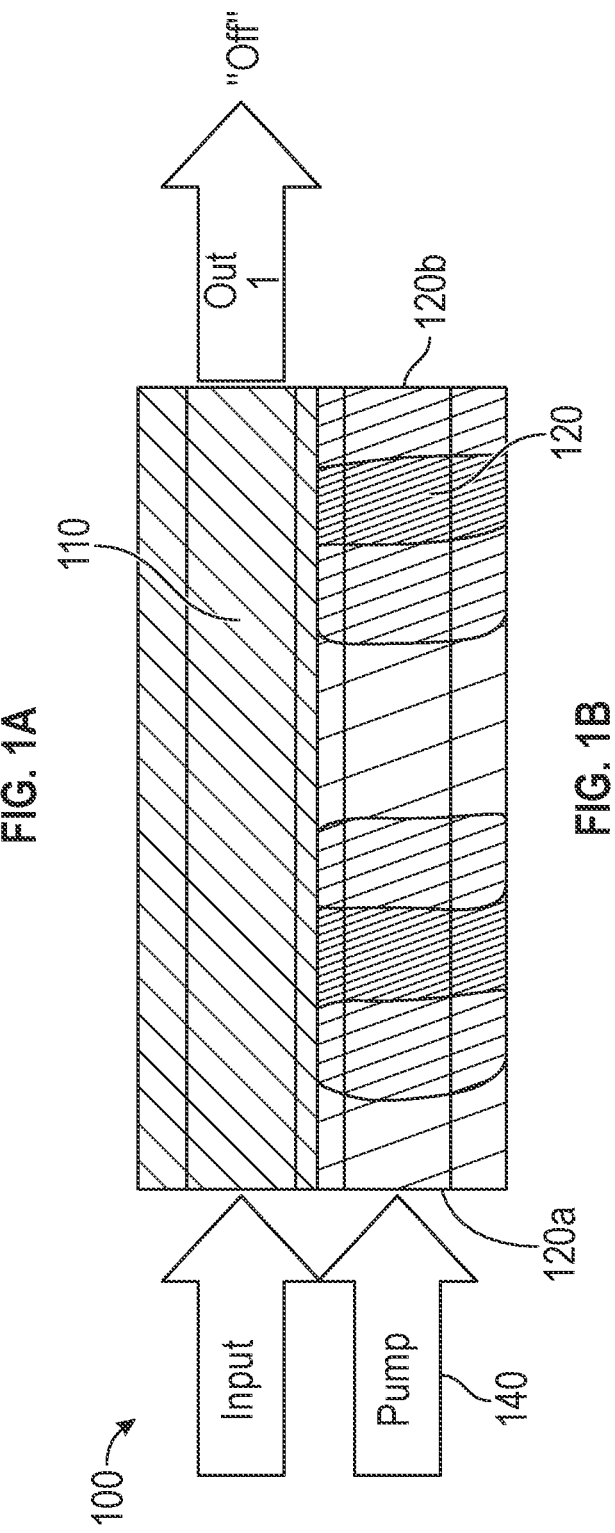

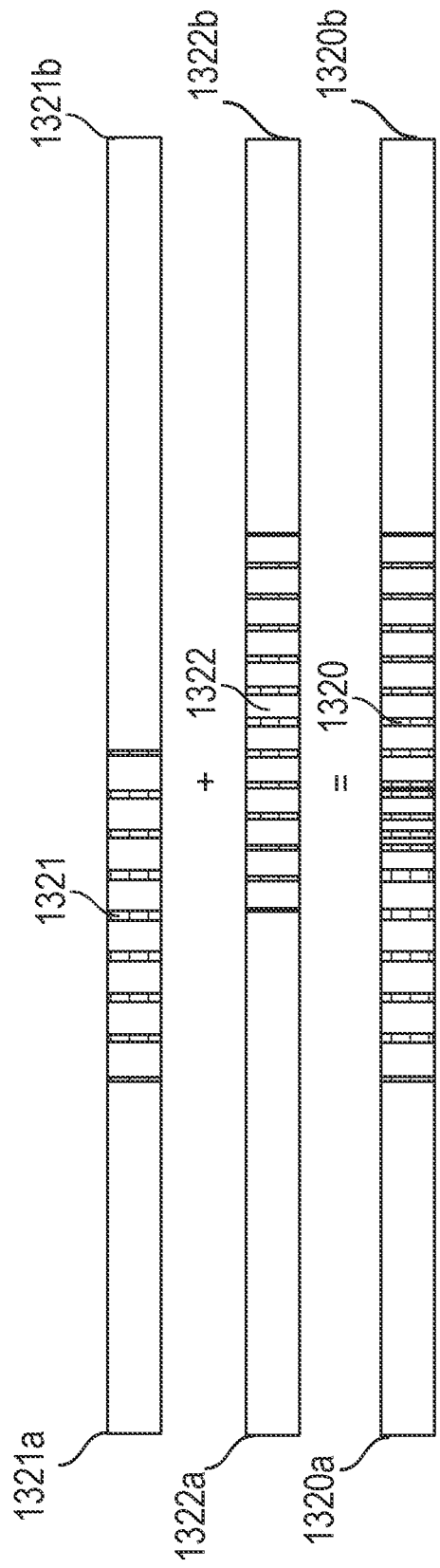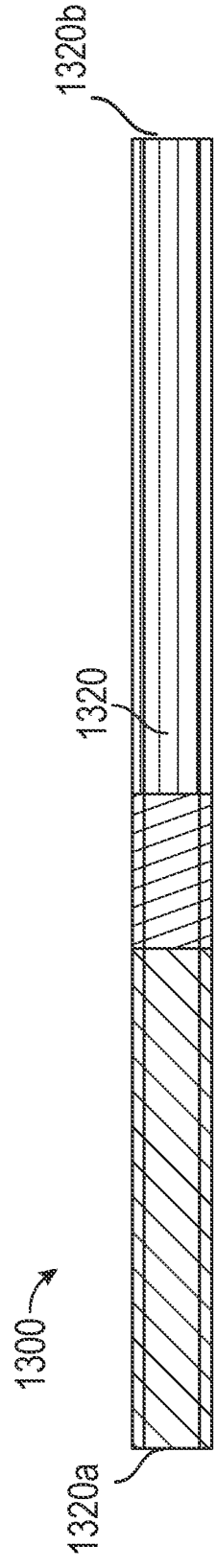
FIG. 13A
FIG. 13B

ULTRA-LOW-NOISE, ON-CHIP QUANTUM DEVICES

CROSS-REFERENCE TO RELATED APPLICATION/CLAIM OF PRIORITY

This application claims the benefit of, and priority to, U.S. Provisional Patent Application No. 63/122,562, filed on Dec. 8, 2020, the entire contents of which are hereby incorporated herein by reference.

GOVERNMENT SUPPORT

This invention was made with government support under 70NANB16H168 awarded by the National Institute of Standards and Technology. The government has certain rights in the invention.

TECHNICAL FIELD

The present disclosure relates generally to the field of quantum optical fields. More specifically, an aspect of the present disclosure provides ultra-low noise on-chip quantum devices.

BACKGROUND

In traditional optical photonic devices such as quantum frequency conversion, photonic circuits enable execution of a variety of algorithms on the same device. Optical photonic devices are potentially reprogrammable, but semiconductor technology is limited to specific wavelengths and fails to integrate electronics, detectors, and light sources on the same chip. This presents challenges in frequency and speed in reprogramming methods. Accordingly, there is interest in improving optical photonic devices using three-wave mixing (TWM) processes to improve their frequency and speed.

SUMMARY

An aspect of the present disclosure provides a quantum optical switch that includes a linear waveguide, a nonlinear waveguide configured to be evanescently coupled to the first waveguide, and a pump coupled to the nonlinear waveguide. The first waveguide may be linear or nonlinear In accordance with aspects of the disclosure, the quantum optical switch may further include a first optical source coupled to the first waveguide.

In an aspect of the present disclosure, the quantum optical switch may further include a second optical source coupled to the nonlinear waveguide.

In another aspect of the present disclosure, the first waveguide may include a waveguide loop.

In yet another aspect of the present disclosure, the pump may be configured to enable writing or extracting a photon to or from the waveguide loop based on three-wave mixing.

An aspect of the present disclosure provides a waveguide loop-based quantum memory that includes an optical source, a nonlinear waveguide coupled to the optical source, a waveguide loop configured to be evanescently coupled to the nonlinear waveguide, and a pump coupled to the nonlinear waveguide.

In accordance with further aspects of the present disclosure, the pump may be configured to selectively generate a control field for the nonlinear waveguide.

In an aspect of the present disclosure, the pump may include a first state where the pump is on, and the control field is present, and a second state where the pump is off and the control field is absent.

In another aspect of the present disclosure, the pump may be configured to enable accessing the waveguide loop based on the first state or the second state of the pump.

In yet another aspect of the present disclosure, the pump may be configured to write or extract a photon to or from the waveguide loop based on three-wave mixing.

In yet another aspect of the present disclosure, the three-wave mixing may produce a spatial optical mode and a spectral optical mode in the nonlinear waveguide.

An aspect of the present disclosure provides an apparatus for quantum frequency transduction that includes a nonlinear waveguide, a first pump waveguide coupled to the nonlinear waveguide, and a second pump coupled to the nonlinear waveguide.

In accordance with further aspects of the present disclosure, the first pump may include a first optical beam, and the second pump may include a second optical beam.

In another aspect of the present disclosure, the first optical beam and the second optical beam may be different wavelengths from each other.

In yet another aspect of the present disclosure, the nonlinear waveguide may include a first optical wavelength.

In a further aspect of the present disclosure, the first optical beam and the second optical beam may have different spectral modes from each other.

In yet a further aspect of the present disclosure, the apparatus may further include a plurality of spectral modes in the nonlinear waveguide.

In an aspect of the present disclosure, the apparatus may further include a second waveguide coupled to the first nonlinear waveguide and a third waveguide coupled to the first nonlinear waveguide.

In an aspect of the present disclosure, the apparatus may further include an evanescently coupled waveguide array, and two optical gaussian pump beams coupled with nonorthogonal injection angle to the waveguide array.

In yet a further aspect of the present disclosure, the apparatus may further include a nonlinear waveguide with two combined overlapping amplitude-modulated polings in a single waveguide Further details and aspects of exemplary embodiments of the present disclosure are described in more detail below with reference to the appended figures.

BRIEF DESCRIPTION OF THE DRAWINGS

A better understanding of the features and advantages of the present disclosure will be obtained by reference to the following detailed description that sets forth illustrative embodiments, in which the principles of the present disclosure are utilized, and the accompanying drawings of which:

FIGS. 1A and 1B illustrate a quantum optical switch, in accordance with examples of the present disclosure;

FIGS. 13A and 13B illustrate an apparatus for quantum frequency transduction of FIGS. 8, 9 in a single nonlinear waveguide configuration, in accordance with examples of the present disclosure.

DETAILED DESCRIPTION

Figure 2:
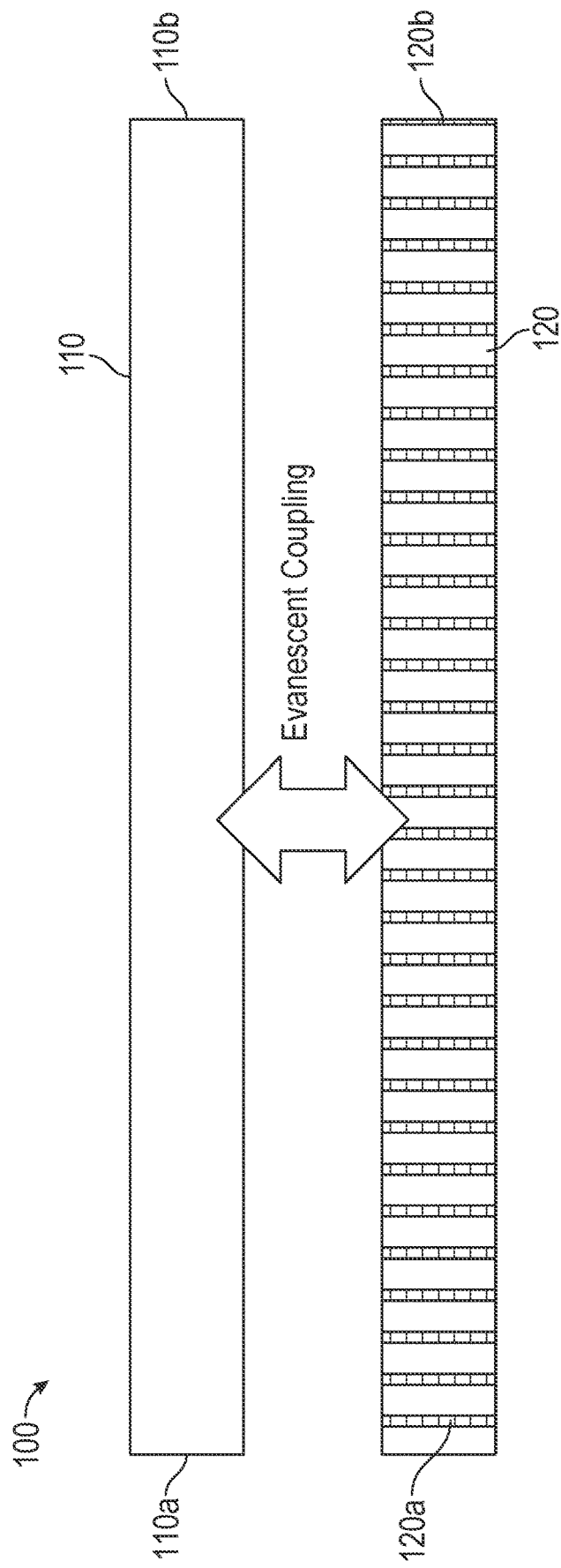
FIG. 2 schematically illustrates the two waveguides arranged to enable evanescent coupling in the quantum optical switch of FIG. 1A, in accordance with examples of the present disclosure.

The present disclosure relates generally to the field of quantum optical fields. More specifically, an aspect of the present disclosure provides ultra-low noise on-chip quantum devices.

Embodiments of the present disclosure are described in detail with reference to the drawings wherein like reference numerals identify similar or identical elements.

Although the present disclosure will be described in terms of specific examples, it will be readily apparent to those skilled in this art that various modifications, rearrangements, and substitutions may be made without departing from the spirit of the present disclosure. The scope of the present disclosure is defined by the claims appended hereto.

For purposes of promoting an understanding of the principles of the present disclosure, reference will now be made to exemplary embodiments illustrated in the drawings, and specific language will be used to describe the same. It will nevertheless be understood that no limitation of the scope of the present disclosure is thereby intended. Any alterations and further modifications of the novel features illustrated herein, and any additional applications of the principles of the present disclosure as illustrated herein, which would occur to one skilled in the relevant art and having possession of this disclosure, are to be considered within the scope of the present disclosure.

A novel formalism is introduced in the present disclosure in which classical and quantum optical fields in evanescently coupled waveguides with second-order nonlinearity can be arranged to model atomic systems interacting with external optical fields. This approach reproduces the phenomena from a rich playbook of atomic quantum optics, such as electromagnetically induced transparency (EIT) and stimulated Raman adiabatic passage (STIRAP), in a nonlinear photonic lattice with all-optical quantum states. In the proposed formalism, atomic levels are represented by spatial and spectral optical modes coupled to each other evanescently or in a controlled manner by TWM nonlinear processes. In contrast to a real atomic system, one can engineer a true 2- or n-level model of the "atomic" system with varying complexity. For example, in the simplest case, all atomic levels can be made non-degenerate and spinless. Such "atomic" systems are not sensitive to external magnetic fields. At the same time, these systems can be tuned via temperature and via TWM nonlinear control.

A number of photonic devices, inspired by the analogy with the atoms, are disclosed herein. For example, an all-optical analog of EIT in the system of two evanescently coupled waveguides may be used as an ultrafast broadband all-optical switch or on-chip quantum memory. Similarly, a STIRAP optical analogy gives rise to robust frequency transduction when direct frequency conversion is impractical. Key advantages of nonlinear coupling between modes over linear coupling are: (1) the coupling strength can be changed by the end-user simply by adjusting pump power, (2) the coupled modes may have the same or different frequencies, (3) a synthetic spectral dimension can be added to the spatial dimension of a waveguide array, and (4) large spectral detunings between single-photon and strong pump modes can be maintained and strong pumps may be detuned to longer wavelengths with more flexibility thus enabling manipulation of single-photon modes with nearly no background added.

With reference to FIGS. 1A-4, diagrams for a quantum optical switch 100 are shown in accordance with the present disclosure. The quantum optical switch 100 generally includes a first waveguide 110, a nonlinear waveguide 120, and a pump 140 coupled to the nonlinear waveguide. The first waveguide 110 may be a linear or a nonlinear waveguide. The first waveguide includes an input 110a and an output 110b. The nonlinear waveguide includes an input 120a and an output 120b. It is contemplated that the signal input 110a and outputs 110b and 120b may be reversed to signal input 110b and outputs 110a and 120a if the pump input 120a and output 120b are also reversed.

The nonlinear waveguide 120 is evanescently coupled to the first waveguide 110. In aspects, the evanescently coupled waveguides 110, 120 include a second-order nonlinearity and may be arranged to model atomic systems interacting with external optical fields (e.g., such as pump 140). For example, the pump 140 may include but is not limited to a classical pump such as an optical laser. In aspects, the devices disclosed herein may include a Lithium Niobate (LN) platform from, e.g., thin-film LN wafers and waveguides. Devices on LN wafers are integrated and CMOS compatible. The devices use quadratic linear optical effects where pump-induced noise is reduced to nearly zero.

The three-wave mixing (TWM) in a nonlinear waveguide using the plane-wave approximation is shown, and it is noted that complete energy conversion from one wavelength to another is possible. Very high quantum sum/difference-frequency generation (SFG/DFG) conversion efficiencies were demonstrated experimentally. For example, nearly 100% internal efficiency for the pulse conversion and more than 80% efficiency for continuous-wave conversion, was demonstrated. A 100% conversion has been approached even in a more challenging case of second harmonic generation. In the slowly varying amplitudes approximation and in the presence of a strong pump field $A_p$ with frequency $\omega_p$, evolution of an input optical field $A_i$ with frequency $\omega_i$ and sum-frequency field $A_s$ with frequency $\omega_s$, can be written as $$\begin{cases} \partial_z A_i = \frac{2i\omega_i^2 d_{eff}}{k_i c^2} A_p^* A_s e^{-i\Delta k z}, \\ \partial_z A_s = \frac{2i\omega_s^2 d_{eff}}{k_s c^2} A_p A_s e^{i\Delta k z}, \end{cases}$$

where $\omega_s = \omega_i + \omega_p$, c is speed of light in vacuum, $d_{eff}$ is the effective nonlinear coupling coefficient defined by nonlinear properties of the waveguide, and $\Delta k = k_i + k_p - k_s$ is the phase mismatch. Here the propagation constants are $k_{i,s,p} = \eta_{i,s,p} \omega_{i,s,p}/c$, where $\eta_{i,s,p}$ are the effective refractive indexes in the waveguides of the input, sum-frequency, and pump optical modes, respectively. In the non-depleted pump approximation $\partial_z A_p \approx 0$. By using the following substitutions:

$$\Omega/2 = \frac{2d_{eff}}{c}|A_p|\sqrt{\omega_i \omega_s/(n_i, n_s)};$$
$$\phi = \arg(A_p);$$
$$A_i = C_i\sqrt{\omega_i/n_i};$$
$$A_s = C_s\sqrt{\omega_s/n_s},$$

one can rewrite the system as:

$$\begin{cases} \partial_z C_i = i\frac{\Omega}{2} C_s e^{-i\phi} e^{-i\Delta k z}, \\ \partial_z C_s = i\frac{\Omega}{2} C_i e^{i\phi} e^{i\Delta k z}. \end{cases}$$

These equations are mathematically identical to those describing Rabi oscillations of an idealized single two-level atom interacting with a single-mode classical field in the absence of dephasing. Here temporal evolution of atomic states is replaced by the spatial evolution of the optical modes during propagation in a nonlinear waveguide (t→z), and $\Omega$ is equivalent to the atomic Rabi frequency. Notice that the average photon flux for input and sum-frequency fields may be written as:

$$\langle F \rangle_{i,s} = \frac{I_{i,s}}{\hbar\omega_{i,s}} = \frac{2n_i c \epsilon_0 |A_{i,s}|^2}{\hbar\omega_{i,s}} = 2c\epsilon_0 |C_{i,s}|^2.$$

Therefore, absolute squares of amplitudes $|C_{i,s}|^2$ are proportional to the photon fluxes in the corresponding optical modes {i, s}. At the same time, in this all-optical analogy to the atomic system, $|C_{i,s}|^2$ represent populations of the two states of the model two-level atom. Therefore, a TWM process may be used for an all-optical simulation of an atomic system, with the population of the "optical atomic states" directly mapping to a photon flux. Thus, populations of all-optical atomic states are proportional to optical power in each mode and thus can be measured using an optical power meter.

The extension of the theoretical model to a quantum description of the optical modes in the waveguide, except for the strong undepleted pump field(s) may be treated classically. The interaction Hamiltonian for the nonlinear waveguide describing TWM coupling between two quantized spectral modes for sum(s) and input (i) photons, respectively, is:

$$H = i\frac{2d_{eff}|A_p|}{c}\left(\frac{\omega_i}{n_i}e^{-i\phi}e^{-i\Delta k z}a_i^\dagger a_s + \frac{\omega_s}{n_s}e^{i\phi}e^{i\Delta k z}a_s^\dagger a_i\right).$$

Let us first consider the case of only one photon present in the system:

$$\psi(0) = (b_{|1_i,0_s\rangle} a_i^\dagger + b_{|0_i,1_s\rangle} a_s^\dagger)|0\rangle,$$

$$1 = |b_{|1_i,0_s\rangle}|^2 + |b_{|0_i,1_s\rangle}|^2.$$

In this case, one can look for the solution of the non-stationary Schrödinger equation (NSE) in the following form:

$$\psi(z) = (b_{|1_i,0_s\rangle}(z) a_i^\dagger + b_{|0_i,1_s\rangle}(z) a_s^\dagger)|0\rangle.$$

By using the substitution (2) and projecting on the Fock basis, one can obtain the following system of equations for complex amplitudes $b_{i,s}$ for single-photon excitation in the nonlinear waveguide:

$$\begin{cases} \partial_z b_{|1_i,0_s\rangle} = i\frac{\Omega}{2} b_{|0_i,1_s\rangle} e^{-i\phi} e^{-i\Delta k z}, \\ \partial_z b_{|0_i,1_s\rangle} = i\frac{\Omega}{2} b_{|1_i,0_s\rangle} e^{i\phi} e^{i\Delta k z}. \end{cases}$$

Notice that these equations are identical to the semi-classical approach after substitution $b_{|1_i,0_s\rangle} \to C_i$ and $b_{|0_i,1_s\rangle} \to C_s$. Thus, when only a single photon is present, fully quantum optical models of an atom are identical to their semi-classical counterparts. However, in the quantum regime, the "atomic" state populations now correspond to the populations of the single-photon states in signal and idler modes $|b_{|0_i,1_s\rangle}|^2$ and $|b_{|1_i,0_s\rangle}|^2$, rather than to the values of the photon flux in these modes. Therefore, the classical case is analogous to a simulation for mean values of atomic populations and coherences, while the single-photon simulates experiments with single atoms.

In the single-photon case, the fact that only two states—$|1_i, 0_s\rangle$ and $|0_i, 1_s\rangle$—exist in the waveguide, allows the mapping of the two states into the Jaynes-Cummings states $|g, 1\rangle$ and $|e, 0\rangle$, where g and e are indexes of the ground and excited states of the atom, and "0" and "1" are the number of photons in each mode of the quantized optical field.

With more than one photon in the waveguide, all possible combinations of the two-mode Fock states $|n_i, n_s\rangle$ such that $n = n_i + n_s$ can be present in the waveguide. For n=2, there are three possible combinations: $|2_i, 0_s\rangle$, $|0_i, 2_s\rangle$ and $|1_i, 1_s\rangle$. Using the above Hamiltonian, one can obtain the following system of equations for complex amplitudes of these states:

$$\begin{cases} \partial_z b_{20} = i\frac{\Omega}{2}\sqrt{2}\, b_{11} e^{-i\phi} e^{-i\Delta k z}, \\ \partial_z b_{11} = i\frac{\Omega}{2}\sqrt{2}\, (b_{20} e^{i\phi} e^{i\Delta k z} + b_{02} e^{-i\phi} e^{-i\Delta k z}), \\ \partial_z b_{02} = i\frac{\Omega}{2}\sqrt{2}\, b_{11} e^{i\phi} e^{i\Delta k z}, \end{cases}$$

where the index notations $b_{|p_i,q_s\rangle} \Rightarrow b_{pq}$ were simplified. In the case of two-photon excitation, a spectral NOON state with N=2 is coupled to a biphoton state $|1_i, 1_s\rangle$, and equivalent to the Hong-Ou-Mandel effect in two coupled linear waveguides for two indistinguishable photons. For an arbitrary length of the waveguides, the Hamiltonian is equivalent to a beamsplitter, but instead of splitting a beam in two spatial directions, the beam is split into two different spectral modes.

In a linear waveguide array, evanescent coupling of a single spectral mode m in the $j^{th}$ waveguide to its next neighbor is described by the system of ordinary differential equations $$\partial_z A_j{}^m = i(c_{j,j+1}{}^m A_{j+1}{}^m + c_{j,j-1}{}^m A_{j-1}{}^m).$$

Similarly, the poling can be designed to phase-match more than just one set of TWM-coupled modes. Poling is the process through which the distribution of the electrical charges is changed. Generally, the charges are randomly distributed, and no permanent electric field exists inside the optical waveguide. When the charges are moved and fixed at a place then a permanent field will be recorded in the optical waveguide. This electric field will permit various optical functions in the optical waveguide, impossible otherwise. The resulting effect would be like having positive and negative poles as in a battery but inside an optical waveguide. Thus, multiple coupled modes can co-exist in a single waveguide. In a full analogy with evanescent coupling, if several TWM processes are phase-matched, coupling between several spectral components can be induced by using multiple pumps (e.g., pump 140). The advantages of this configuration are threefold. First, the coupling coefficients $\Omega_j{}^{lm}/2$, phases $\phi_j{}^{lm}$ and phase mismatch $\Delta k_j{}^{lm}$ may be controlled by tuning external pump fields. Second, coupled fields can have different wavelengths, which increases the range of practical devices that can be built based on this platform. Third, by combining the two types of coupling, it is possible to take advantage of synthetic dimension(s) due to spectral modes. Particularly, a 1D array of physical waveguides becomes a quasi N-dimensional (N≥2) array of coupled modes. In the undepleted pump approximation, and using the substitution (2) for M spectral modes:

$$\partial_z C_j^m = i(\Lambda_{j,j+1}^m C_{j+1}^m - \Lambda_{j,j-1}^m C_{j-1}^m) +$$
$$+ i/2 \sum_{l \neq m} \Omega_j^{lm}(z) e^{\pm i \phi_j^{lm}} e^{\pm i \Delta k_j^{lm} z} C_j^l,$$

where $\Omega_j{}^{lm}(z)/2$ is an effective TWM coupling coefficient (Rabi frequency) between m and l spectral modes in the $j^h$ waveguide, $\Lambda_{j,j\pm 1}{}^m = c_{j,j\pm 1}{}^m \sqrt{\omega_m/n_m}$ is the effective evanescent coupling of spectral mode m between neighboring $j^{th}$ and $(j+1)^{th}$ waveguides, and the positive (negative) argument of the exponent corresponds to the SFG (DFG) coupling. In this configuration, the value of $\Omega_j{}^{lm}(z)$ can change with propagation parameter z, since the pump field can oscillate between the neighbor waveguides due to their evanescent coupling. One can take advantage of this effect to engineer Floquet-type interactions in the system. Thus, in contrast with evanescently coupled arrays, taking advantage of the spectral domain allows the flexibility of using the same physical device to simulate different Hamiltonians.

By increasing the number of photons n and spectral modes M, the number of possible states are effectively increased and the effective dimensionality of the waveguide array. An effective number of dimensions can be calculated as the number of possible combinations to distribute n photons over M different modes. Note that this photonic platform is similar to an array of linearly coupled waveguides. However, an advantage may be taken of an extra degree of freedom, i.e., the spectral domain. The Hamiltonian for the array of N coupled nonlinear waveguides, supporting M different quantized spectral modes and up to M(M−1) strong pumps (to couple all spectral modes pairwise), can be written as $\hat{H} = \hat{H}_0 + \hat{H}_{int}$, where:

$$H_0 = \sum_{\substack{j=1,N \\ m=1,M}} k_j^m a_j^{m\dagger} a_j^m$$

is the Hamiltonian of non-interacting modes with propagation constants $k_j{}^m$, corresponding to photons in waveguide j and spectral mode m. The interaction Hamiltonian reads:

$$H_{int} = \sum_{\substack{j=1,N \\ 1 \leq m < l \leq M}} \left( p_j^{lm}(z) e^{-i\Delta k_j^{lm} z} a_j^{m\dagger} a_j^l + h.c. \right)$$
$$+ \sum_{\substack{j=1,N \\ m=1,M}} (C_{j,j+1}^m a_j^{m\dagger} a_{j+1}^m + C_{j,j-1}^m a_j^{m\dagger} a_{j-1}^m + h.c.),$$

where $P_j{}^{lm}$ are the coupling coefficients between $m^{th}$ and $l^{th}$ spectral modes due to TWM processes in the $j^{th}$ nonlinear waveguide with the phase mismatch $\Delta k_j{}^{lm}$·$C_{j,j\pm 1}{}^m$ are the coupling constants between $m^{th}$ spectral modes in the neighboring waveguides. Dependence of $P_j{}^{lm}$ coefficients on propagation coordinate z is due to possible evanescent tunneling of pump fields to the neighbor waveguides. The pump field evolution in the undepleted pump approximation is driven by the coupling between the waveguides only:

$$i\partial_z P_j^{lm} = C_{j,j+1}^{lm} P_{j+1}^{lm} - C_{j,j+1}^{lm} P_{j-1}^{lm},$$

where $C_{j,j\pm 1}{}^{lm}$ are coupling constants for the pump field to neighbor waveguides.

The Hamiltonian describes a 2D photonic lattice, however, the 2nd dimension is synthetic due to different frequency modes within the 1-dimensional nonlinear waveguide array. In contrast to the passive evanescent field coupling between nearest-neighbor waveguides, TWM-mediated coupling in the synthetic spectral dimension enables a reconfigurable, tunable system. A wide variety of Hamiltonians may be designed in the frequency domain: from a 1D Ising model with all-to-all coupling to a Honeycomb lattice, from a stub lattice or a dimer lattice to the Floquet system, in which temporal modulations are introduced via the oscillations of the pump field between neighbor waveguides. Therefore, a physical layer of a 1D array of nonlinear waveguides can be extended to a 2D system with the synthetic spectral dimension. In contrast to conventional photonic waveguide arrays, in which the coupling between the waveguides is mostly limited by the nearest neighbors interactions, the quasi-phase-matching in periodically poled waveguides can be engineered to couple all spectral modes. This coupling is controlled by the pump strength. Thus, such a system can be used to simulate complex band structures and topological effects such as "bosonic" superradiance.

Of particular interest here are novel devices that are inspired by coherent atomic phenomena. To this end, a three-level atom interacting with two classical fields enables an all-optical analog of the coherent population trapping (CPT), EIT, and STIRAP effects. Practical photonic devices based on EIT and STIRAP using a small number of waveguides and pumps are disclosed. The 1D photonic system can emulate complex, multidimensional Hamiltonians that typically occur in photonic lattices filled with cold atomic gases. The semi-classical description presented can be straightforwardly extended to a single-photon case.

Consider the simplest case of two waveguides $\{0,1\}$ with $\Lambda^m = \Lambda_{0,1}{}^m = \Lambda_{1,0}{}^m$ and two spectral modes $\{i,s\}$ with $\Omega_{0,1} = \Omega_{0,1}{}^{i,s}/2$:

$$\begin{cases} i\partial_z C_0^i = -\Lambda^i C_1^i - \Omega_0 e^{-i\phi_0} e^{-i\Delta k_0 z} C_0^s, \\ i\partial_z C_0^s = -\Lambda^s C_1^s - \Omega_0 e^{i\phi_0} e^{i\Delta k_0 z} C_0^i, \\ i\partial_z C_1^i = -\Lambda^i C_0^i - \Omega_1 e^{-i\phi_1} e^{-i\Delta k_1 z} C_1^s, \\ i\partial_z C_1^s = -\Lambda^s C_0^s - \Omega_1 e^{i\phi_1} e^{i\Delta k_1 z} C_1^i, \end{cases}$$

Figures 3A, 3B:
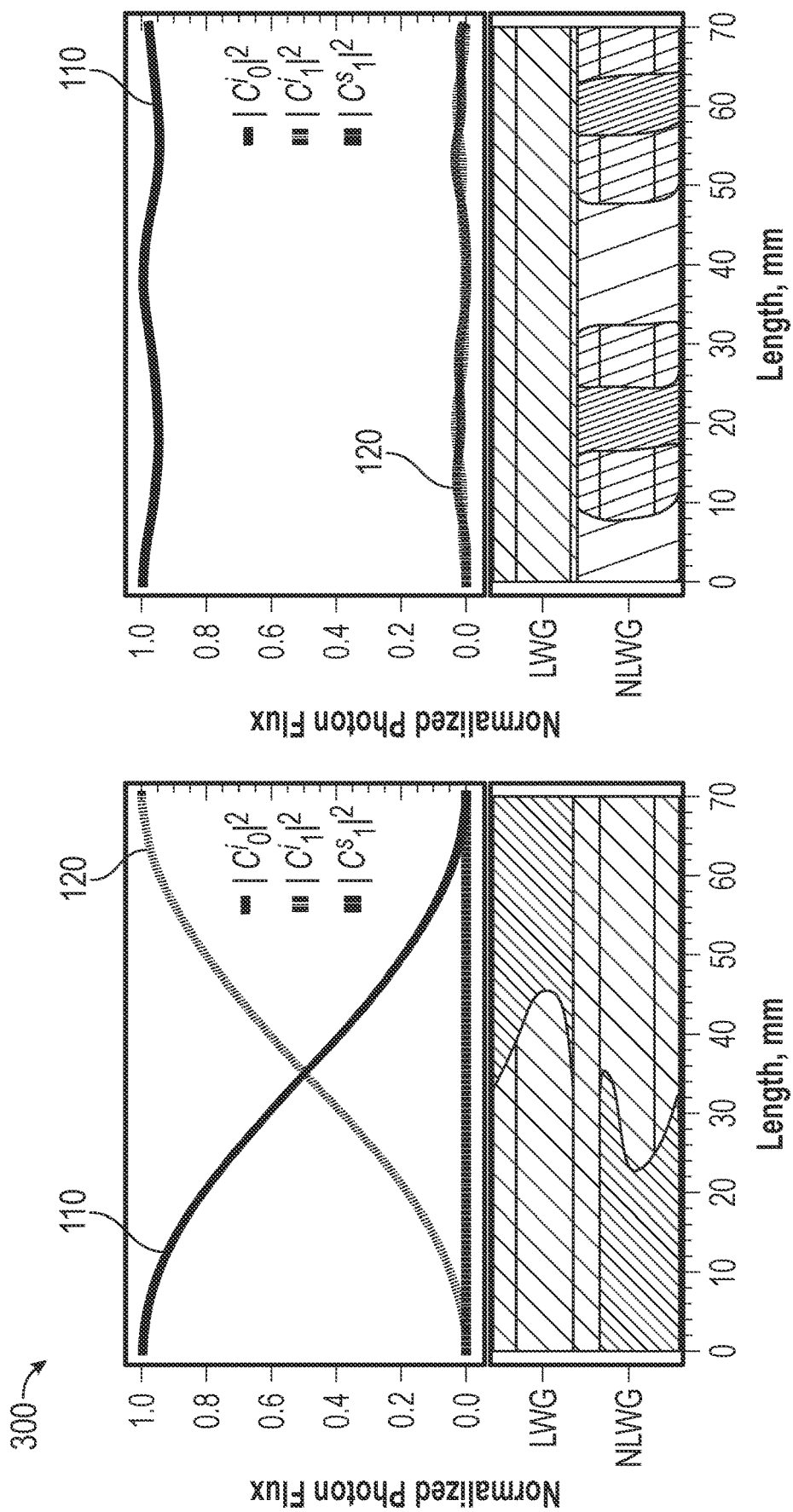
FIGS. 3A and 3B illustrate a photon flux in a quantum switch, in accordance with examples of the disclosure.

For simplicity, the wavelength $\lambda_s \ll \lambda_i$. Then $\Lambda^i \gg \Lambda^s \approx 0$ because modes with a shorter wavelength are better confined. By using identical pump fields in both waveguides one can eliminate the dependence of $\Omega$ on z. Further, assuming that TWM is phase-matched only in the first waveguide, the above equations can then be rewritten as:

$$\begin{cases} i\partial_z C_0^i(z) = -\Lambda^i C_1^i, \\ i\partial_z C_1^i(z) = -\Lambda^i C_1^i - \Omega_1 e^{-i\phi_1} e^{-i\Delta k_1 z} C_1^s, \\ i\partial_z C_1^s(z) = -\Omega_1 e^{i\phi_1} e^{i\Delta k_1 z} C_1^i, \end{cases}$$

where the equation for $C_0^s$ is dropped since $C_0^s$ is decoupled from other modes. Following the analogy of all-optical atomic states, this photonic model can be interpreted as a three-level "atomic" system and, therefore, can be used to simulate EIT-like processes. In the absence of the pump 140, $C_1^P = 0$, the idler field oscillates periodically between the two waveguides 110, 120 due to their evanescent coupling. By selecting an appropriate coupling constant $\Lambda^i$ and length of the chip L, the input $|C_0^i(0)|^2 = 1$, $|C_1^i(0)|^2 = 0$ can be fully transferred into the other waveguide at the output: $|C_0^i(L)|^2 = 0$, $|C_1^i(L)|^2 = 1$. The results of numerical simulations for this system are shown in FIG. 3A. The pump field turns on the coupling between the spectral modes "i" and "s" in the waveguide 120. A proper choice of the coupling constants suppresses the light transfer between the waveguides (110, 120) due to the EIT-like destructive interference. The results of numerical simulations for this system are shown in FIG. 3B, where the nonlinear coupling strength $\Omega_1 = 0.23$ mm$^{-1}$ corresponds to a modest pump power of 200 mW and the frequency conversion normalized efficiency $\eta = 2600\%$ W$^{-1}$ cm$^{-2}$, values reported experimentally for nanophotonic periodically poled lithium niobate (PPLN) waveguides. The unique property of this effect is that both the input and the output remain at the same frequency ($\omega_i$), while the control field can be significantly red-detuned from both the input and output frequencies to eliminate both Raman and SPDC noise in LN. In practice, the above-noted properties may be used as an ultrafast quantum optical switch 100 (i.e., an all-optical switch) for faint states of light. The switching time for the quantum optical switch 100 is limited only by the bandwidth of the TWM process in the nonlinear waveguide and thus can achieve sub-ps switching times.

Referring to FIGS. 3A and 3B, graphs illustrating photon flux in the ultrafast all-optical switch implemented with a coupled linear waveguide (LWG) 110 and nonlinear waveguide (NLWG) 120 are shown. In the absence of an optical control pump field, the signal field is transferred from LWG to NLWG (FIG. 3A). When the control field is applied, the signal field remains in LWG due to an EIT-like destructive interference (FIG. 3B). The bottom portions of FIGS. 3A and 3B show a layout of waveguides in the proposed experimental implementation (disproportionally scaled because waveguide width is of order of 1 μm). The gradients represent the switching process in coupled LWG and NLWG.

Figure 4:
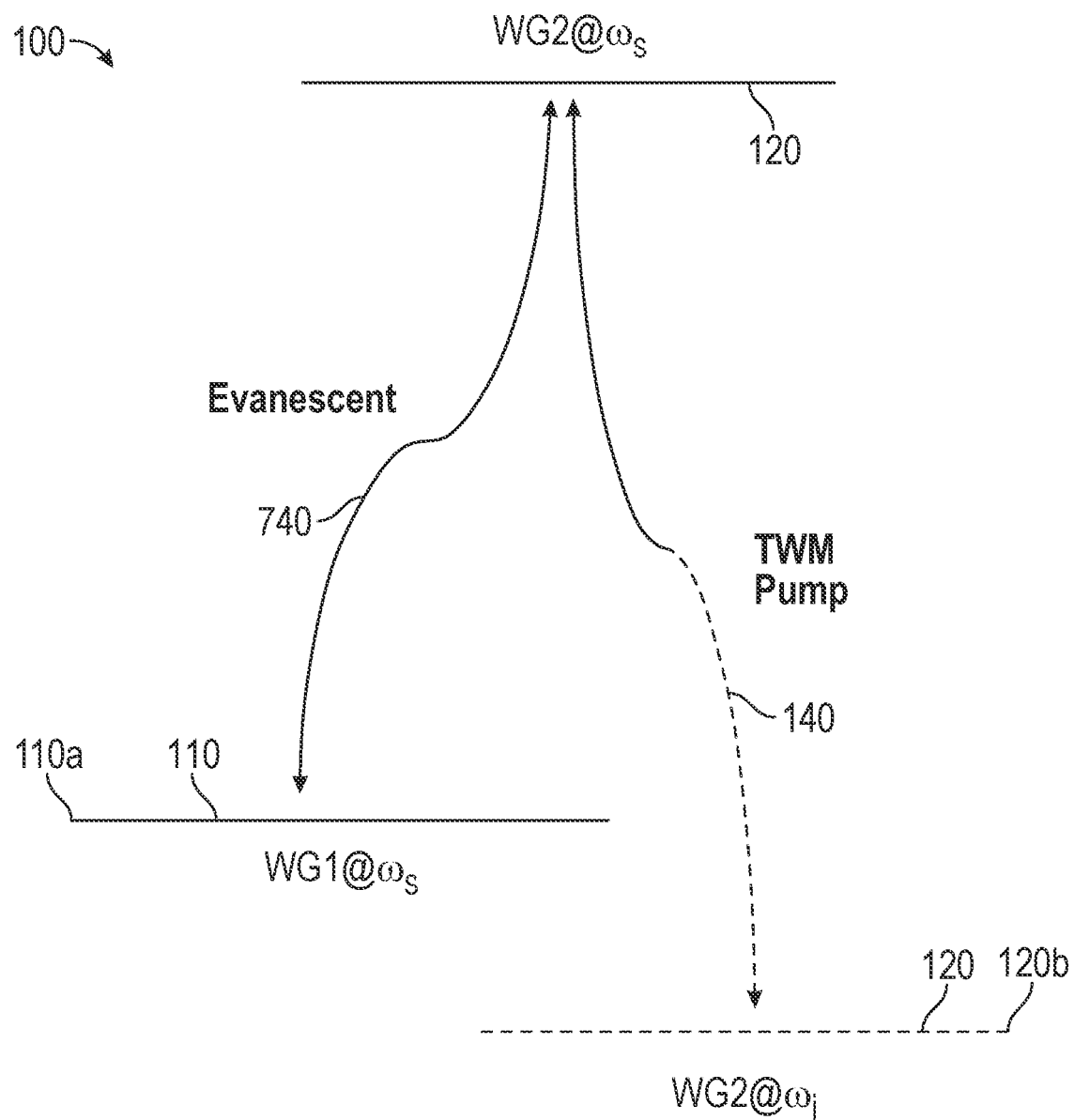
FIG. 4 schematically illustrates the quantum optical switch of FIGS. 1A and 1B, in accordance with examples of the present disclosure.

Referring to FIG. 4, the quantum optical switch 100 of FIGS. 1A and 1B is shown. Generally, the quantum optical switch 100 apparatus for an EIT-like ultrafast all-optical switch includes waveguide 110 (which may be linear or nonlinear) where an input signal in spectral mode "s" is coupled as shown in FIGS. 1A and 1B, the spectral mode "s" in the waveguide 110 is evanescently coupled to the same spectral mode in the waveguide 120, and in the absence of the pump filed will result in complete transfer of the signal to the output port 120b of the waveguide 120 corresponding to the "On" state of the switch from the FIG. 1A. In waveguide 120 an additional spectral mode "i" coupled to spectral mode "s" by TWM interaction with pump 140. In the presence of the pump 140 this coupling results in EIT-like destructive interference and prevents transfer of the input signal from waveguide 110 to waveguide 120, in this case, the signal will be guided to the output 110a of the waveguide 110 corresponding to the "Off" state of the switch from the FIG. 1B.

Figure 5:
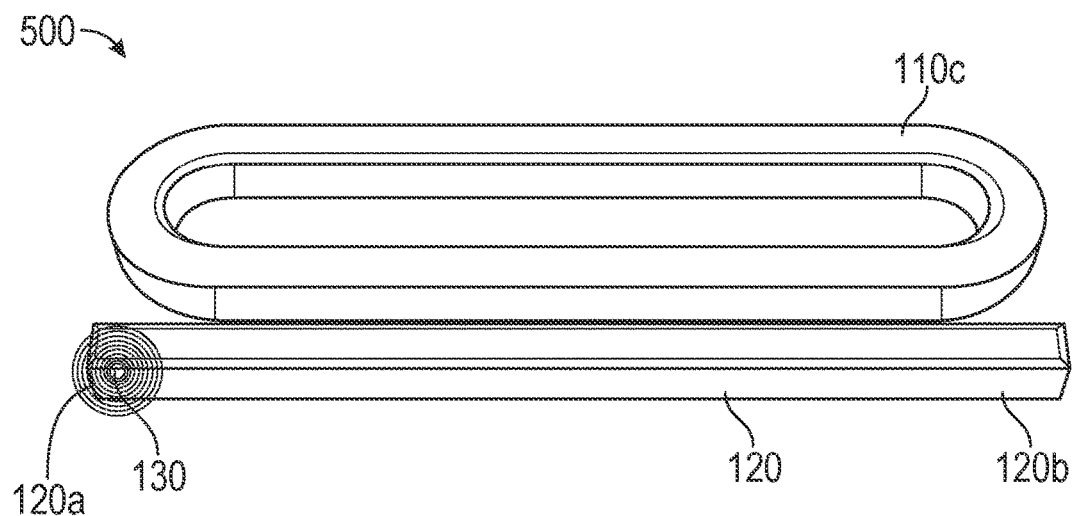
FIG. 5 illustrates a waveguide loop-based quantum memory, in accordance with examples of the present disclosure.
Figure 6:
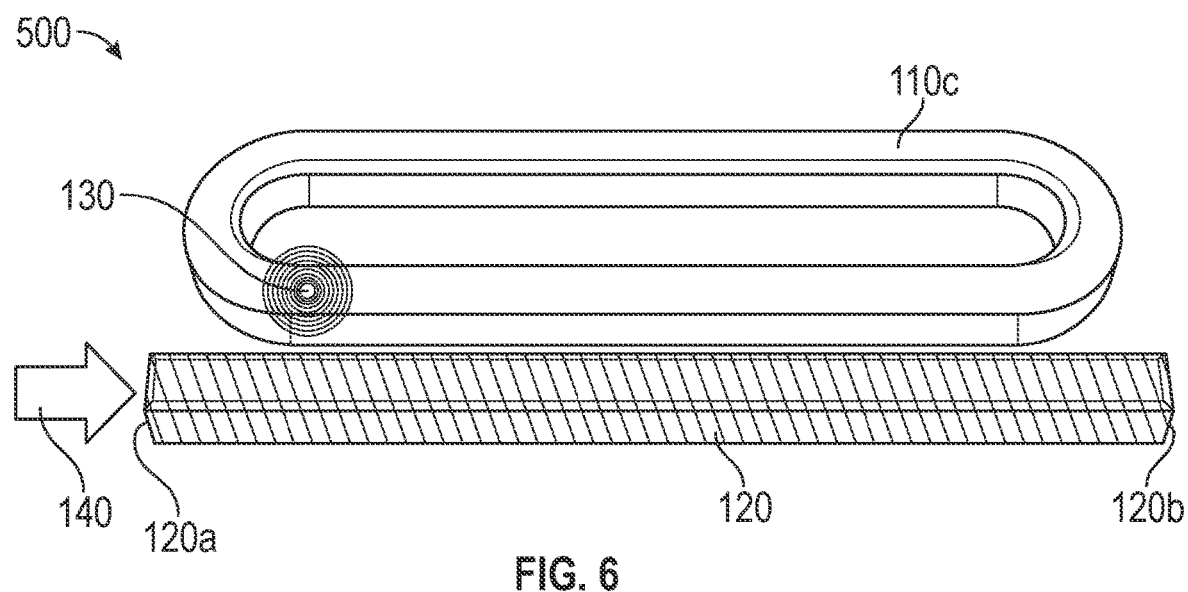
FIG. 6 illustrates the waveguide loop-based quantum memory of FIG. 5 storing a photon in a waveguide loop, in accordance with examples of the present disclosure.
Figure 7:
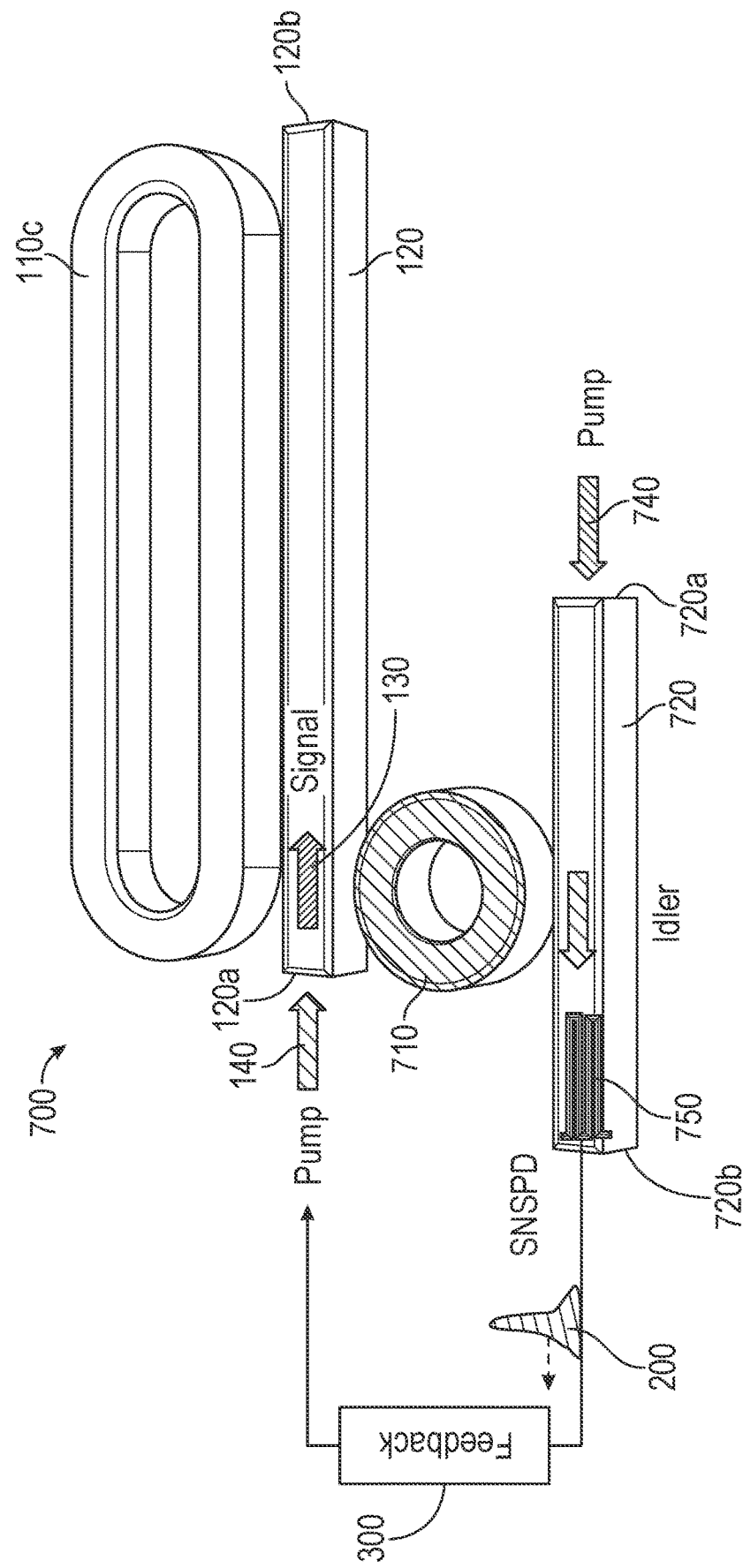
FIG. 7 illustrates the waveguide loop-based quantum memory of FIG. 5 showing an integrated heralded single-photon source and heralding detector for idler photon, in accordance with examples of the present disclosure.

Referring to FIGS. 5-7 a waveguide loop-based quantum memory 500 is shown in accordance with the present disclosure. The waveguide loop-based quantum memory 500 generally includes an optical source 130, a nonlinear waveguide 120 coupled to the optical source 130, a waveguide loop 110c configured to be evanescently coupled to the nonlinear waveguide 120, and a pump 140 coupled to the nonlinear waveguide 120. The optical source 130 may include an optical signal, e.g., a single photon. The optical signal may include any quasimonochromatic optical signal at the wavelength coupled by TWM in the nonlinear waveguide, including but not limited to a single photon or a laser light pulse.

The pump 140 is configured to selectively generate a control field for the nonlinear waveguide 120. The pump 140 includes a first state where the pump 140 is "on," the control field is present, and a second state where the pump is "off" and the control field is absent. The pump 140 may be further configured to enable accessing the waveguide loop 110c based on the first state or the second state of the pump 140. The pump may be further configured to write or extract a photon to or from the waveguide loop 111 based on TWM. The three-wave mixing produces a spatial optical mode and a spectral optical mode in the nonlinear waveguide.

The waveguide loop 110c with an integrated switch can store short broadband optical pulses, operating as an ultrafast and broadband waveguide loop-based quantum memory 500. For example, a single round trip delay of $L_{loop}/(nc) \approx 1$ ns can be realized in a looped ≈7 cm-long waveguide (same as the expected nonlinear interaction length of the proposed switch). Due to the high internal losses (of the order of ≈0.03 dB/cm), the storage time in a lithium niobate waveguide loop device is limited to just a few ns. Longer storage times are achievable by employing low-loss materials such as silicon nitride to fabricate the waveguide loop 110c (e.g., a delay loop waveguide) that is evanescently coupled to PPLN waveguide. This is because only one waveguide needs to be nonlinear for the EIT-like switching method to work.

Referring to FIG. 7, the waveguide loop-based quantum memory 700 may further include a second nonlinear waveguide loop 710. The second nonlinear waveguide loop 710 may be coupled to a second waveguide 720 and may be configured for optical parametric generation. The second waveguide 720 may include an integrated single-photon detector 750, e.g., superconducting nanowire single-photon detector SNSPD or transition edge sensor (TES). SNSPD is a type of optical and near-infrared single-photon detector based on a current-biased superconducting nanowire. The photon pair generation in the nonlinear waveguide loop 710 with a second pump 740 coupled to the second waveguide 720 then signal single-photon generation in the first waveguide 120 can be heralded using integrated single-photon detector (SDP) 750 by detecting an idler photon. Upon photon detection by SDP 750, a heralding electrical pulse 200 is produced that can be digitized and processed with a feedback system 300, e.g., Field Programmable Gate Array (FPGA). The feedback system can be programmed to use heralding electrical pulse 200 to trigger pump 140 to store the signal photon in the waveguide loop 110c.

In STIRAP, the population is transferred between two atomic states via two sequential coherent pulses. All-optical STIRAP may be used for frequency conversion between the states that are hard to couple in a single-step TWM transduction. For example, the use of a blue detuned pump can be undesirable since the use of a blue detuned pump can result in significant background noise due to spontaneous parametric down-conversion (SPDC) processes even when this SPDC is not phase-matched. Alternatively, the two states can be spectrally too close to couple them directly using an accessible pump. Indeed, transduction between the two communication bands at 1310 nm and 1550 nm via TWM nonlinear frequency conversion requires a pump at 8.5 μm, but the transparency window in most TWM crystals is limited to 5 μm in the infrared; the other choice is to use a 710 nm pump, but the SPDC background noise will be significant. If the strong pump is too close to one of the fields spectrally, significant background noise will be generated via Raman scattering. For instance, if transduction between the Rubidium transition at 780 nm ($^{87}$Rb D$_2$ ($5^2S_{1/2} \to 5^2P_{3/2}$)) and the telecommunication band at 1550 nm is desired, a strong pump at 1570 nm is required, which is detuned by just 20 nm from one of the fields. The STIRAP approach allows coupling the two target spectral modes while avoiding the practical limitations of TWM.

Figure 8:
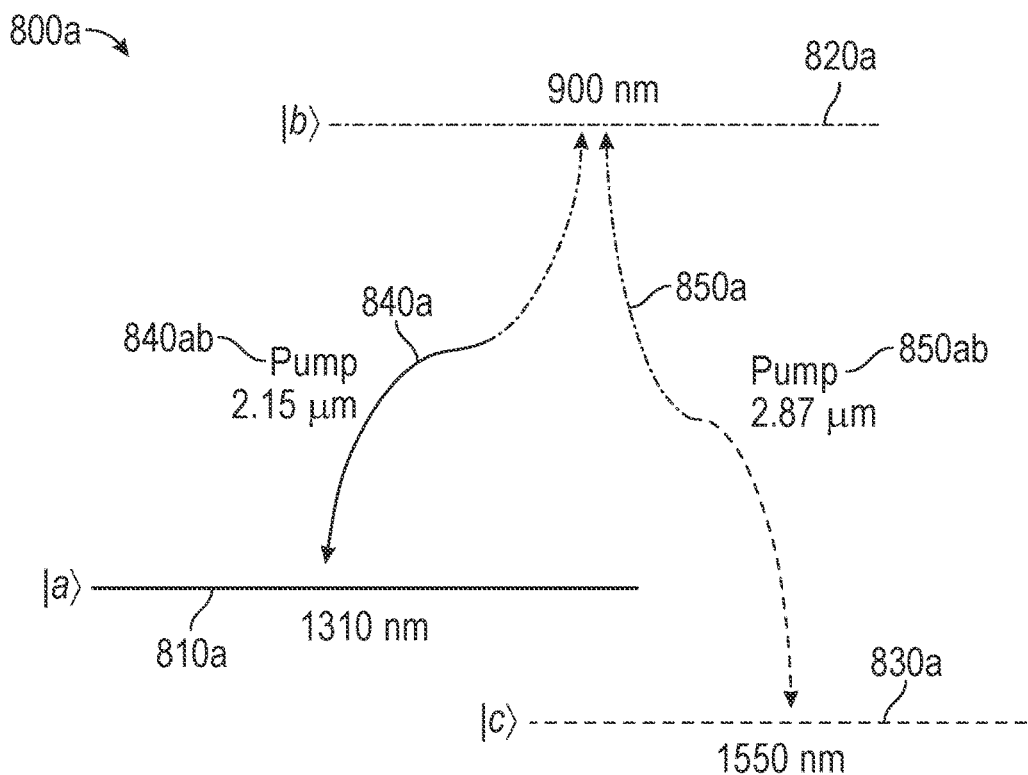
FIG. 8 schematically illustrates an apparatus for quantum frequency transduction in a Λ-configuration, in accordance with examples of the present disclosure.
Figure 9:
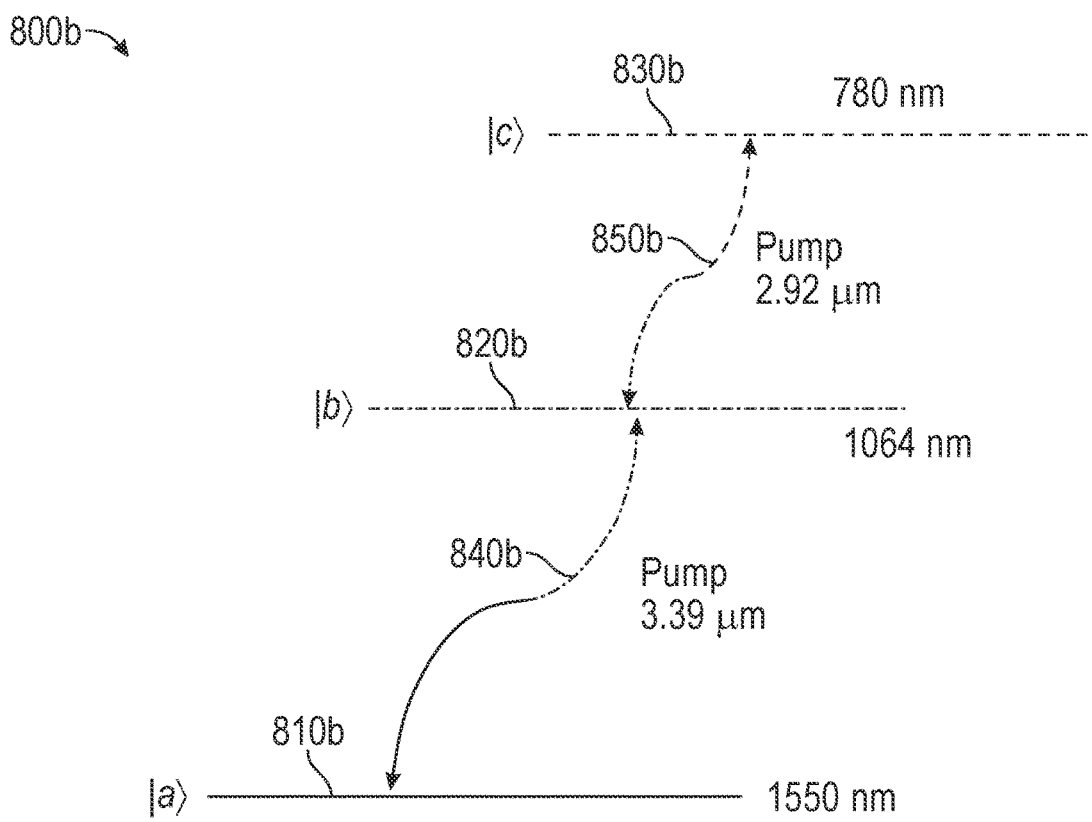
FIG. 9 schematically illustrates an apparatus for quantum frequency transduction in a ladder-configuration, in accordance with examples of the present disclosure.

Referring to FIGS. 8 and 9, an apparatus 800a (A-configuration), 800b (ladder configuration) for quantum frequency transduction using STIRAP is shown. Generally, the apparatus 800a, 800b for quantum frequency transduction includes an intermediate spectral mode 820a, 820b, a first pump 840a, 840b coupled to the intermediate spectral mode 820a, 820b and first spectral mode 810a, 810b, and a second pump 850a, 850b coupled to the intermediate spectral mode 820a, 820b and second spectral mode 830a, 830b. In aspects, the first optical wavelength 810a, 810b is transduced to a second optical wavelength 830a, 830b or vice versa based on the coupling of the spectral optical modes between the first pump 840a, 840b and second pump 850a, 850b with TWM nonlinear process. It is contemplated that the frequency may be translated from frequency |a> to frequency |c> or, from frequency |c> to frequency |a> based on the timing order of the TWM coupling applied to the signal, similarly to the STIRAP in atomic systems.

Two configurations are possible, depending on the frequencies of the participating optical fields. A Λ-configuration can be used to couple two spectrally close target fields (FIG. 8). A ladder configuration (FIG. 9) is desirable for spectrally distant target fields. In our first example above, one can couple the two communication bands via an intermediate "dark state" at 900 nm with the proposed STIRAP-like TWM using two commercially available pumps at ≈2.15 μm and ≈2.87 μm that conveniently occur within the transparency window of lithium niobate. The second example of Rb frequency transduction can be realized using an intermediate "dark state" at 1064 nm and two pumps at 2.9 μm and 3.4 μm. The STIRAP-like evolution of the optical fields is described by the following system of differential equations:

$$\begin{cases} i\partial_z C_a(z) = -\Omega_{ab}(z)e^{i\Delta k_{ab}z}C_b, \\ i\partial_z C_b(z) = -\Omega_{ab}(z)e^{-i\Delta k_{ab}z}C_a - \Omega_{bc}(z)e^{\pm i\Delta k_{bc}z}C_c, \\ i\partial_z C_c(z) = -\Omega_{bc}(z)e^{\mp i\Delta k_{bc}z}C_b \end{cases}$$

where signs of the exponent's arguments are "+" in the second equation and "−" in the third equation for a Λ-configuration. For a ladder-configuration (FIG. 9), these signs are flipped. To achieve full population transfer between the target fields, coupling with pump fields should change during propagation. One can implement such controllable change by sending the pumps through two separate waveguides whose transverse position changes with the propagation coordinate. Target fields propagate in a central waveguide.

Figure 10:
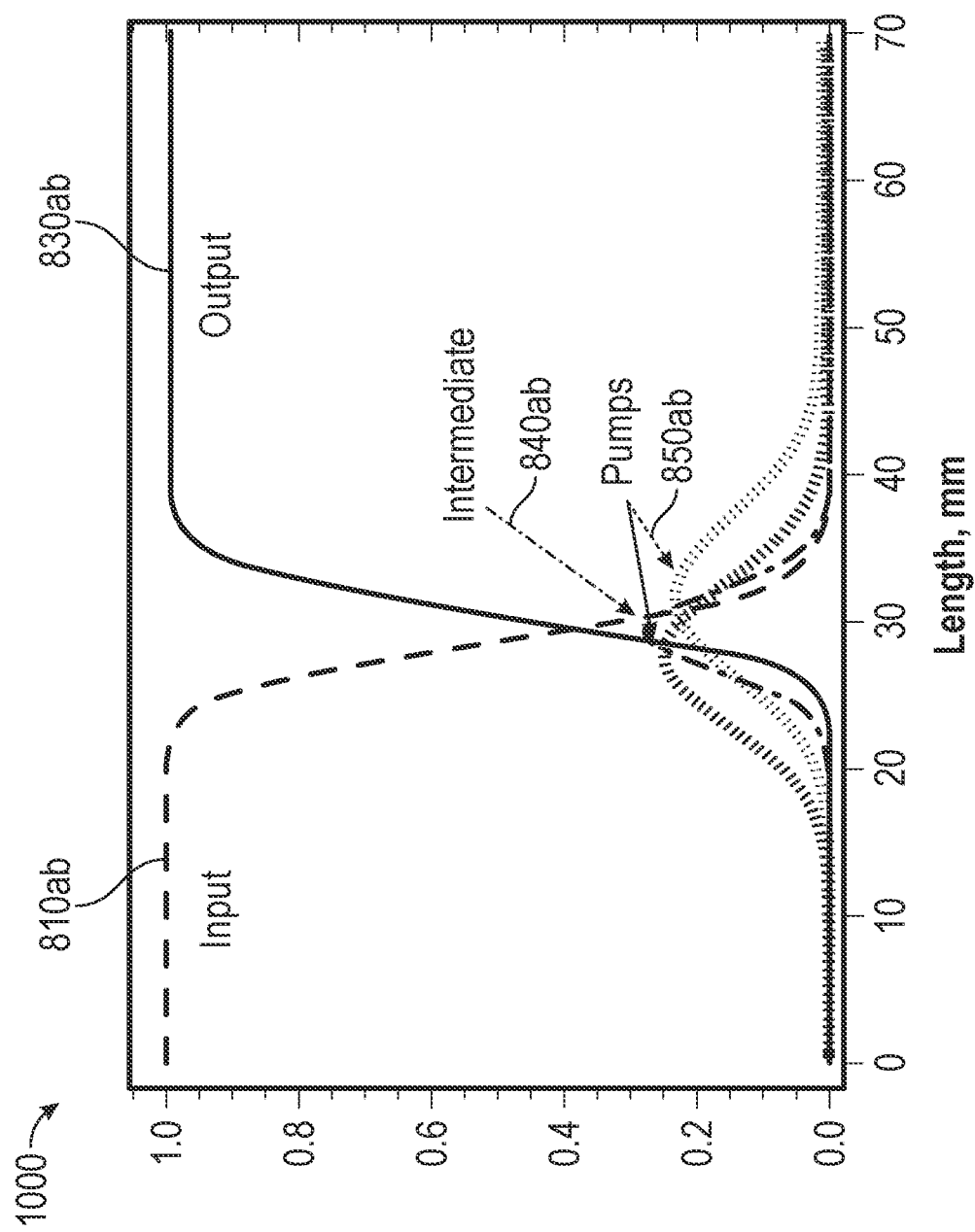
FIG. 10 illustrates photon flux for the all-optical STIRAP frequency conversion implemented with three coupled waveguides, in accordance with examples of the present disclosure.
Figure 11:
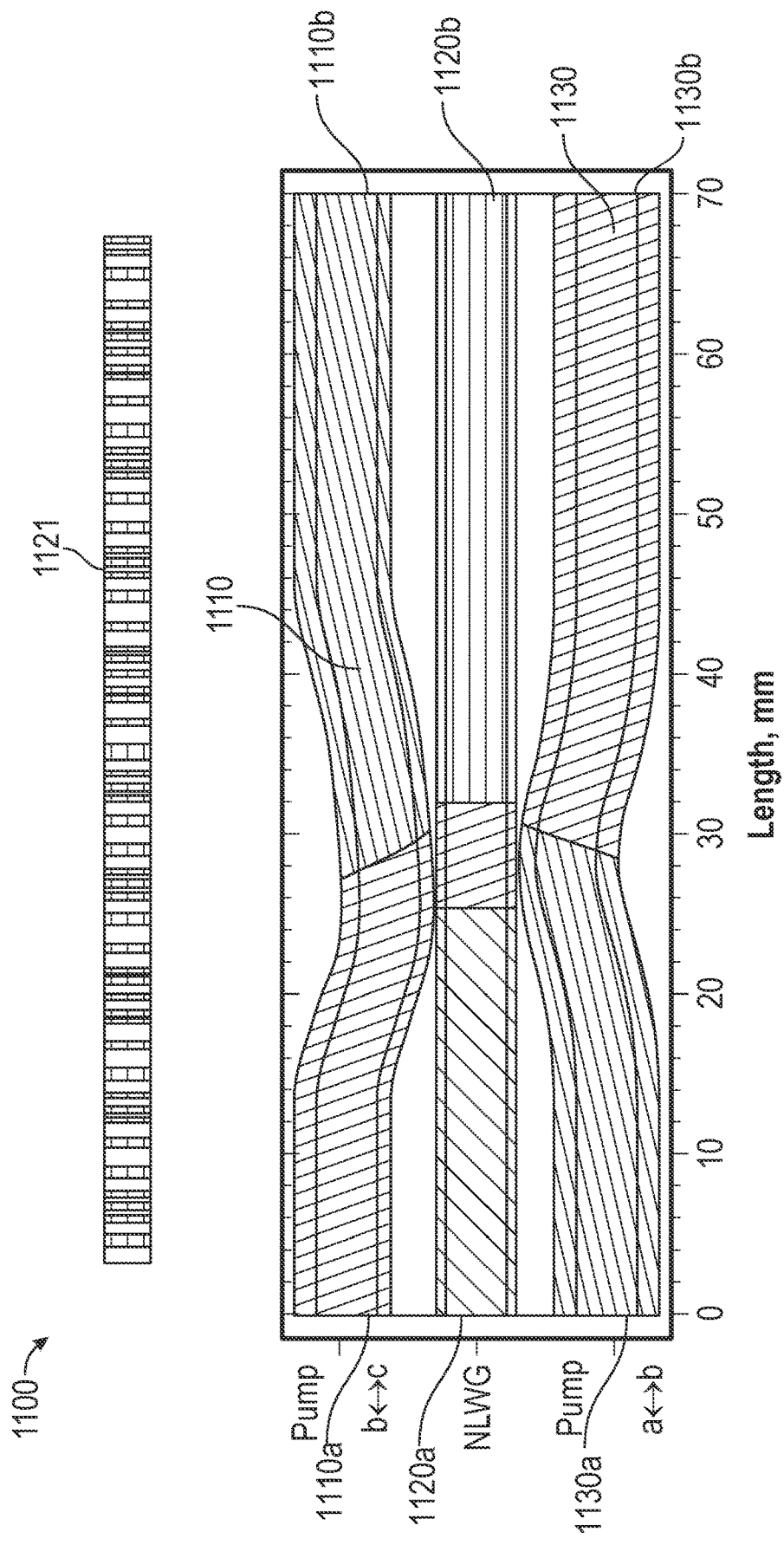
FIG. 11 illustrates an apparatus for quantum frequency transduction of FIGS. 8, 9 in accordance with examples of the present disclosure.

Referring to FIG. 10, the photon flux for the all-optical STIRAP frequency conversion implemented with three coupled waveguides is shown. FIG. 11 shows the waveguide design 1100. In this model $\lambda_{a,b,c} \ll \lambda_{a \leftrightarrow b, b \leftrightarrow c}^{pump}$ is used so the coupling of the fields a, b, c to adjacent linear waveguides delivering pump fields to the NLWG can be neglected. The evanescent coupling between the waveguides are the same for both pump fields ($\lambda_{a \leftrightarrow b}^{pump} \approx \lambda_{b \leftrightarrow c}^{pump}$). The central nonlinear waveguide 1120 includes polings with two periods 1121 to support quasi-phase matching (QPM) condition for two TWM processes, coupling all three spectral modes, and is the carrier of the target fields. The side waveguides 1110, 1130 deliver pump fields. Nonlinear coupling strengths are approximately the same as in the EIT model. It is contemplated that the inputs 1110a, 1120a, 1130a, and outputs 1110b, 1120b, 1130b may be reversed for inverse transduction for the simultaneous bidirectional transduction, or pump fields can be interchanged and then inverse transduction can be performed in the same direction.

Figure 12:
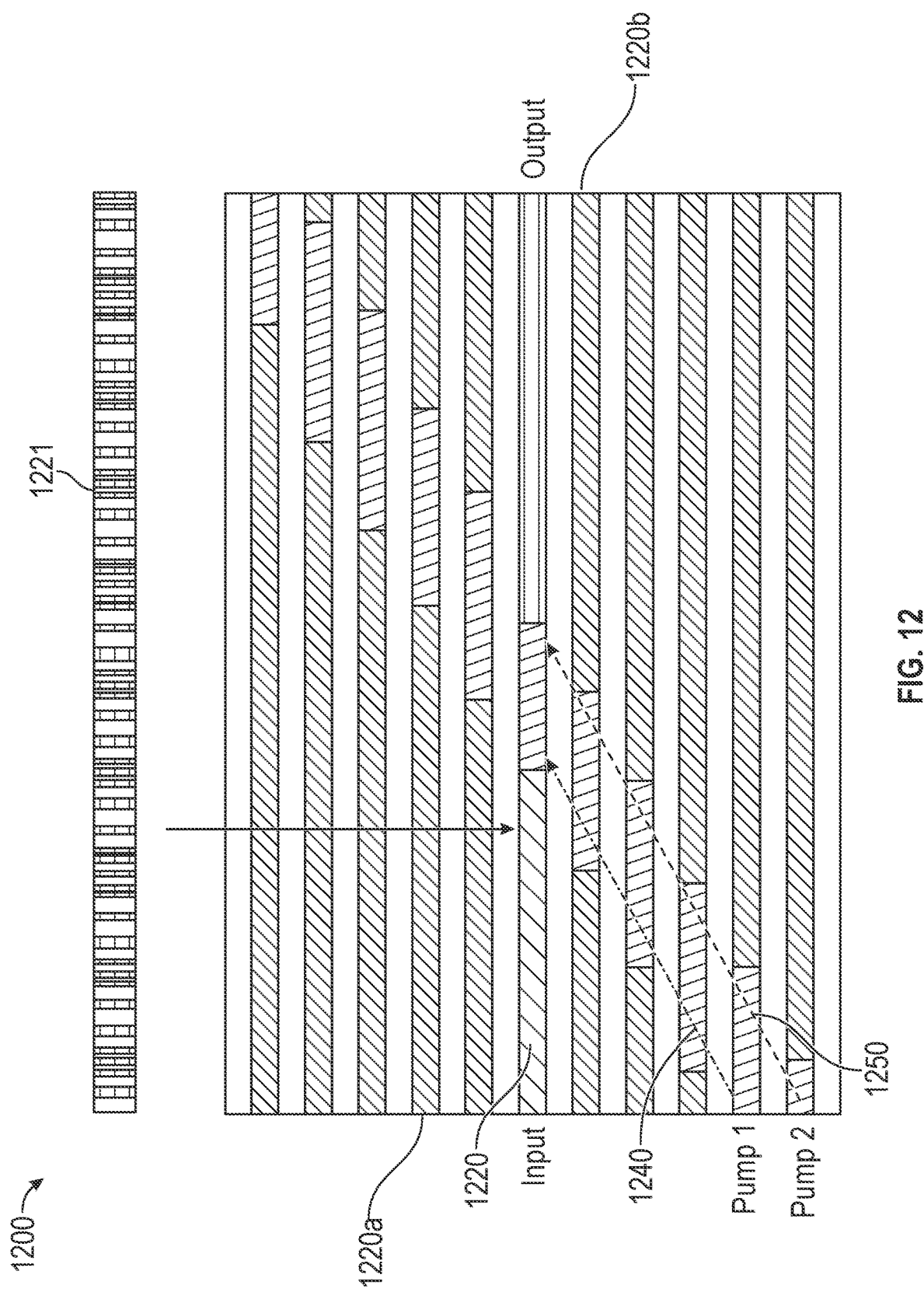
FIG. 12 illustrates an apparatus for quantum frequency transduction of FIGS. 8, 9 in a waveguide array configuration, in accordance with examples of the present disclosure.

Referring to FIG. 12, an apparatus 1200 for quantum frequency transduction using a waveguide array is shown. Generally, the apparatus 1200 for quantum frequency transduction is similar to apparatus 800a, 800b, except that it uses a waveguide array and the first pump 1240 and second pump 1250 are introduced at a nonorthogonal angle. The first and second pump 1240, 1250 may be at different wavelengths. This way pump fields 1240, 1250 can be delivered to the central nonlinear waveguide 1220 that includes poling with two periods 1121 to support quasi-phase matching (QPM) condition for the two TWM processes via angled excitation of the waveguide array by gaussian pump beams as shown in FIG. 12. Such excitation results in directed propagation of the pumps from one side of the array to another and can be used to couple pumps 1240, 1250 to a central nonlinear waveguide 1220 carrying signal wavelength input that will be transduced to the output wavelength input via STIRAP-like transduction. Diffraction of pumps 1240, 1250 can be avoided by using a zero-diffraction propagation angle specific to a waveguide array. It is contemplated that the inputs 1220a and outputs 1220b may be reversed for inverse transduction for the simultaneous bidirectional transduction, or pump fields can be interchanged and then inverse transduction can be performed in the same direction.

Referring to FIGS. 13A and 13B, an apparatus 1300 for quantum frequency transduction using a single nonlinear waveguide 1320 is shown. Generally, the apparatus 1300 for quantum frequency transduction is similar to apparatus 800a, 800b, except that it uses a single nonlinear waveguide 1320 and the first pump 1340 and second pump 1350 are introduced to the same waveguide 1320. The first and second pump 1340, 1350 may be at different wavelengths. The propagation-dependent TWM interaction with pump fields may be implemented, for example, by changing the amplitudes of the Fourier components of the QPM grating along the length of a single waveguide as shown in FIG. 13A. In this case, both pumps and the signal are coupled to the single nonlinear waveguide 1320. The desired interaction envelope for STIRAP-like transduction can be achieved with a Fourier design technique straightforwardly by combining two overlapping amplitude modulated polings 1321, 1322 in a single waveguide 1320. Color gradients in FIG. 13b shows STIRAP-like frequency transduction in a single nonlinear waveguide 1320 with amplitude-modulated poling shown in FIG. 13A. It is contemplated that the inputs and outputs may be reversed based on waveguide poling for the simultaneous bidirectional transduction.

In addition to enhancing the range of low-noise frequency conversion, the proposed device offers the advantage of unique STIRAP robustness that distinguishes this approach from the "intuitively" ordered sequence of π-pulses. Indeed, the π-pulse sequence is very sensitive to pump parameters and waveguide imperfections.

Certain embodiments of the present disclosure may include some, all, or none of the above advantages and/or one or more other advantages readily apparent to those skilled in the art from the drawings, descriptions, and claims included herein. Moreover, while specific advantages have been enumerated above, the various embodiments of the present disclosure may include all, some, or none of the enumerated advantages and/or other advantages not specifically enumerated above.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different example embodiments provided in the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A quantum optical switch, comprising:
   a linear waveguide;
   a nonlinear waveguide evanescently coupled to the linear waveguide; and
   an optical pump field coupled to the nonlinear waveguide,
   wherein the nonlinear waveguide is quasi-phase matched to support quantum frequency transduction of signal photons by the optical pump field to enable switching.

2. The quantum optical switch of claim 1, further comprising:
   a first optical source coupled to the linear waveguide.

3. The quantum optical switch of claim 2, wherein the optical pump field is coupled to the nonlinear waveguide, wherein the optical pump field is red-detuned from the first optical source to eliminate Raman noise.

4. The quantum optical switch of claim 2, wherein the linear waveguide includes a closed waveguide loop.

5. The quantum optical switch of claim 4, wherein the optical pump field is configured to enable writing or extracting a photon to or from the closed waveguide loop based on three wave mixing.

6. A closed waveguide loop-based quantum memory, comprising:
   an optical source;
   a nonlinear waveguide coupled to the optical source;
   a closed waveguide loop configured to be evanescently coupled to the nonlinear waveguide; and
   a pump coupled to the nonlinear waveguide,
   wherein the optical source includes photon wavepackets that are shorter than a propagation time in the closed waveguide loop.

7. The closed waveguide loop-based quantum memory of claim 6, wherein the pump is configured to selectively generate an all-optical analog of electromagnetically induced transparency for the photon wavepackets in the closed waveguide loop by coupling two spectral modes in the nonlinear waveguide via quantum frequency transduction.

8. The closed waveguide loop-based quantum memory of claim 7, wherein the pump includes:
   a first state where the pump is on and the control field is present; and
   a second state where the pump is off and control field is absent.

9. The closed waveguide loop-based quantum memory of claim 8, wherein the pump is configured to enable accessing the closed waveguide loop based on the first state or the second state of the pump.

10. The closed waveguide loop-based quantum memory of claim 7, wherein the pump is configured to write or extract a photon to or from the closed waveguide loop based on three-wave mixing.

11. The closed waveguide loop-based quantum memory of claim 10, wherein the three-wave mixing produces a spatial optical mode and a spectral optical mode in the nonlinear waveguide.

* * * * *